UNITED STATES PATENT OFFICE 2,549,922

METALIZABLE MONOAZO DYESTUFFS AND A PROCESS FOR THEIR MANUFACTURE

Reinhard Neier and Walter Wehrli, Basel, Switzerland, assignors to Sandoz Limited, Basel, Switzerland, a Swiss firm No Drawing. Application January 26, 1948, Serial No. 4,454. In Switzerland January 28, 1947

16 Claims. (Cl. 260—206)

The present invention relates to metallisable monoazo dyestuffs.

It has been found that valuable metallisable monoazo dyestuffs can be prepared by a process comprising the steps of treating a metal complex compound of a monoazo dyestuff of the formula

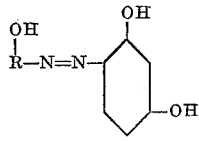

wherein R means a radical selected from the group consisting of benzene and naphthalene radicals, which may carry further substituents, and wherein the hydroxy group of R stands in ortho-position to the azo-bridge, with a compound selected from the group consisting of aliphatic, araliphatic and aromatic sulfonyl halides and of etherifying agents and subsequently treating the reaction product with a metal removing agent.

As starting materials for the present invention there can be used metal complexes of those monoazo dyestuffs which can be prepared from o-hydroxy diazo compounds of the benzene or naphthalene series by coupling with resorcinol.

From the large number of suitable amines, the diazo compounds of which can be used for building up the above defined monoazo dyestuffs, the following may be given as examples only:

1-hydroxy-2-aminobenzene-4-sulfonic acid, 1-hydroxy-2-aminobenzene-4-sulfonic acid amide, 1-hydroxy-2-amino-6-chlorobenzene - 4 - sulfonic acid, 1-hydroxy-2-amino-4-chlorobenzene-6-sulfonic acid, 1-hydroxy-2-amino-4-chlorobenzene-5 - sulfonic acid, 1 - hydroxy-2-amino-4-methylbenzene-6-sulfonic acid, 1 - hydroxy-2-amino-4-methylbenzene - 5 - sulfonic acid, 1 - hydroxy - 2-amino -4- butylbenzene -6- sulfonic acid, 1 - hydroxy - 2 - amino-4-amylbenzene-6-sulfonic acid, 1 - hydroxy - 2-amino-4-nitrobenzene-6-sulfonic acid, 1 - hydroxy-2-amino-6-nitrobenzene-4-sulfonic acid, 1 - hydroxy - 2 - aminobenzene-4-sulfonic acid, 2′ - carboxyphenyl - 1′ - amide, 1 - hydroxy - 2 - amino-4-benzoylaminobenzene-6-sulfonic acid, 1 - hydroxy - 2-amino-4-acetylaminobenzene - 6-sulfonic acid, 1-hydroxy-2-amino-4-carbethoxyaminobenzene - 6-sulfonic acid, 1-hydroxy - 2 - amino - 4-nitrobenzene, 1-hydroxy-2-amino - 4 - chlorobenzene, 1-hydroxy-2-amino-4-chloro - 6 - nitrobenzene, 1 - hydroxy-2-amino-4-nitrobenzene - 6 - carboxylic acid, 1 - hydroxy-2-aminonaphthalene-4-sulfonic acid, 1-hydroxy-2-amino-6-nitronaphthalene-4-sulfonic acid.

The o-hydroxy monoazo dyestuffs serving as starting materials can for example contain the following complex-forming metals: Copper, cobalt, nickel, magnesium, iron, chromium, aluminium, zinc, cadmium, bismuth, manganese and lead.

Media which are suitable for blocking the hydroxyl group present in p-position to the azo group by means of esterification are particularly the aliphatic, araliphatic and aromatic sulfonyl halides, such for example as: methane sulfonyl chloride, ethane sulfonyl chloride, benzyl-sulfonyl chloride, benzene sulfonyl chloride, naphthalene-α-sulfonyl chloride, naphthalene-β-sulfonyl chloride, and also sulfonyl halides substituted in the aryl radical, such as for example p-toluenesulfonyl chloride, o-toluene sulfonyl chloride, p-xylene sulfonyl chloride, p-chlorobenzene sulfonyl chloride, m-nitrobenzene sulfonyl chloride, m-carboxybenzene sulfonyl chloride. Instead of the chlorides also other halides, for instance the bromides, can be used.

If the blocking of the hydroxyl group present in the p-position of the azo group in the metal complexes is carried out by etherification instead of by esterification, then all conventional methods and media can be used for this purpose; thus for example the metal complexes can be treated with alkyl or aryl halides, alkyl sulfates or alkyl esters of aryl-sulfonic acids.

The removal of the metal bound as a complex from the esterified or etherified dyestuff takes place by means of acids or salts. As acids having a de-metallising action, both mineral acids as well as organic acids come into consideration. Amongst the salts for the de-metallising both acid salts, e. g. acid sodium oxalate, and also alkali cyanides and alkali sulphides are particularly suitable. The selection of an agent in any particular case depends chiefly upon which metal in complex combination is to be removed.

The dyestuffs obtained according to the present invention dye wool by means of the after-chroming process in red-brown, red, bordeaux or violet shades. Many of them are particularly suitable for the neutral single bath chroming process. The fastness to light is in general excellent and also the wet fastnesses are good.

In the following examples the parts denote parts by weight.

*Example 1*

42.8 parts of the copper complex of the monoazo dyestuff from 22.4 parts of 1-hydroxy-2-amino-4-chlorobenzene-6-sulfonic acid and 11 parts of resorcinol are treated slowly, in a soda alkaline solution, at 70–75° C. with 20–25 parts of p-toluene-sulfonyl chloride and stirred until all the starting material has disappeared. After the addition of common salt, the sulfonic ester of the dyestuff is filtered off. For splitting off the complex-bound copper, the product is stirred at 0–10° C. with 100 parts of concentrated hydrochloric acid for 1 hour and filtered off. If necessary, the dyestuff can be purified by boiling with water. It dyes wool from an acid bath in brownish-yellow shades. By after-chroming a bordeaux red of excellent fastness properties is obtained. The dyestuff which corresponds to the formula

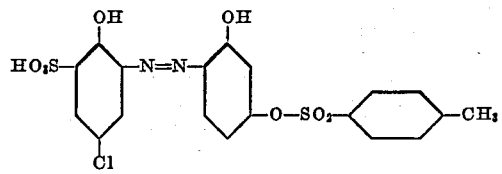

is also very well suited for the neutral single bath chroming process.

*Example 2*

The iron complex of the monoazo dyestuff from 22.4 parts of 1-hydroxy-2-amino-4-chlorobenzene-6-sulfonic acid and 11 parts of resorcinol is treated slowly in a soda-alkaline solution at 70–75° C. with 20–25 parts of p-toluene-sulfonyl chloride and stirred until all the starting material has disappeared. The sulfonic ester of the dyestuff is stirred, in a medium made acid to Congo, with 20 parts of oxalic acid at 70° C. for ½ hour for the purpose of splitting off the complex-bound iron. After the addition of common salt, the salted-out product is filtered off and well washed with a dilute sodium chloride solution. If necessary, the dyestuff can be purified by boiling with water. It is identical with the dyestuff described in the first example.

*Example 3*

36.7 parts of the monoazo dyestuff from 22.4 parts of 1-hydroxy-2-amino-4-chlorobenzene-6-sulfonic acid and 11 parts of resorcinol are boiled in a solution made alkaline by means of sodium carbonate with 6 parts of magnesium oxide and thereupon slowly treated at 70–75° C. with 20–25 parts of p-toluene sulfonyl chloride and stirred until all the starting material has disappeared. Thereupon hydrochloric acid is added at 60–70° C. until the mixture has become acid to Congo, whereupon the product is filtered off. If necessary, the dyestuff can be purified by boiling with water. It is identical with the dyestuff described in the first example.

Further examples are to be found in the following table:

| | Diazo component | Azo component | Agent for blocking the hydroxy group | Shades of the dyeing on wool, after-chromed |
|---|---|---|---|---|
| 1 | 1-hydroxy-2-amino-4-chloro-benzene-6-sulfonic acid | resorcinol | benzene-sulfonyl chloride | bordeaux-red. |
| 2 | do | do | p-toluene-sulfonyl chloride | Do. |
| 3 | do | do | p-toluene-sulfonyl bromide | Do. |
| 4 | do | do | o-toluene-sulfonyl chloride | Do. |
| 5 | do | do | p-xylene-sulfonyl chloride | Do. |
| 6 | do | do | p-chlorobenzene-sulfonyl chloride | Do. |
| 7 | do | do | m-carboxybenzene-sulfonyl chloride | Do. |
| 8 | do | do | benzyl-sulfonyl chloride | Do. |
| 9 | do | do | naphthalene-α-sulfonyl chloride | Do. |
| 10 | do | do | naphthalene-β-chloride | Do. |
| 11 | 1-hydroxy-2-amino-4-methylbenzene-6-sulfonic acid | do | p-toluene-sulfonyl chloride | Do. |
| 12 | 1-hydroxy-2-amino-4-amylbenzene-6-sulfonic acid | do | do | Do. |
| 13 | 1-hydroxy-2-amino-4-methylbenzene-5-sulfonic acid | do | do | Do. |
| 14 | 1-hydroxy-2-amino-4-chlorobenzene-5-sulfonic acid | do | do | Do. |
| 15 | 1-hydroxy-2-amino-4-benzoylaminobenzene-6-sulfonic acid | do | do | violet. |
| 16 | 1-hydroxy-2-amino-benzene-4-sulfonic acid | do | do | brown red. |
| 17 | 1-hydroxy-2-amino-benzene-4-sulfonic acid-2'-carboxyphenyl-1'-amide | do | do | Do. |
| 18 | 1-hydroxy-2-amino-4-nitrobenzene-6-sulfonic acid | do | do | Do. |
| 19 | 1-hydroxy-2-amino-6-nitrobenzene-4-sulfonic acid | do | do | Do. |
| 20 | 1-hydroxy-2-amino-naphthalene-4-sulfonic acid | do | do | violet. |
| 21 | 1-hydroxy-2-amino-4-chlorobenzene | do | ethane-sulfonyl chloride | brown red. |
| 22 | do | do | m-carboxybenzene-sulfonyl chloride | Do. |
| 23 | 1-hydroxy-2-amino-4-nitrobenzene | do | do | Do. |
| 24 | 1-hydroxy-2-amino-4-nitrobenzene-6-carboxylic acid | do | p-toluene-sulfonyl chloride | orange brown. |
| 25 | 1-hydroxy-2-amino-4-chlorobenzene-6-sulfonic acid | do | dimethyl sulfate | bordeaux-red. |
| 26 | do | do | p-toluene sulfonic acid ethyl ester | Do. |
| 27 | do | do | butyl bromide | brown red. |
| 28 | do | do | benzyl chloride | Do. |
| 29 | do | do | allyl bromide | Do. |

Dyestuff No. 1 of the preceding table corresponds to the formula

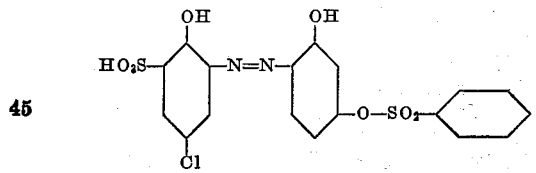

Dyestuff No. 11 of the preceding table corresponds to the formula

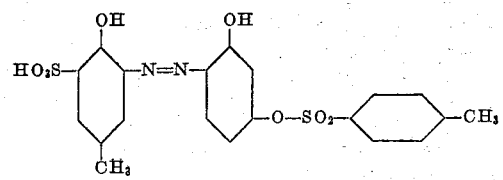

What we claim is:
1. A process for the manufacture of metallizable monoazo dyestuffs, comprising the steps of treating a metal complex compound of a monoazo dyestuff of the formula

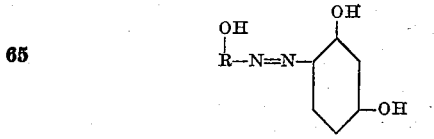

wherein R means a radical selected from the group consisting of benzene and naphthalene radicals, the hydroxy group attached to the radical R standing in ortho-position to the azo-bridge, with a compound selected from the group consisting of aliphatic, araliphatic and aromatic sulfonyl halides and of etherifying agents and of subsequently treating the reaction product with an agent splitting off the metal from the azo dyestuff and binding the said metal.

2. A process for the manufacture of metallizable monoazo dyestuffs, comprising the steps of treating a metal complex compound of a monoazo dyestuff of the formula

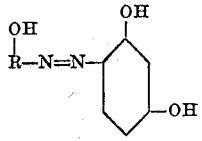

wherein R represents a mononuclear aromatic radical of the benzene series, the hydroxy group attached to the radical R standing in ortho-position to the azo bridge, with an aromatic sulfonyl halide of the benzene series, and of subsequently treating the reaction product with an agent splitting off the metal from the azo dyestuff and binding the said metal.

3. A process for the manufacture of metallizable monoazo dyestuffs, comprising the steps of treating a metal complex compound of a monoazo dyestuff of the formula

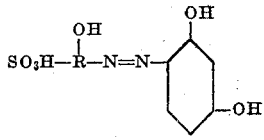

wherein R represents a mononuclear aromatic radical of the benzene series, the hydroxy group attached to the radical R standing in ortho-position to the azo bridge, with an aromatic sulfonyl halide of the benzene series, and of subsequently treating the reaction product with an agent splitting off the metal from the azo dyestuff and binding the said metal.

4. A process for the manufacture of metallizable monoazo dyestuffs, comprising the steps of treating a metal complex compound of a monoazo dyestuff of the formula

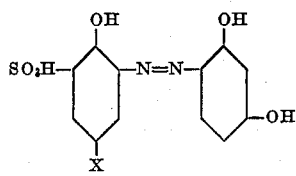

wherein X stands for halogen, with an aromatic sulfonyl halide of the benzene series, and of subsequently treating the reaction product with an agent splitting off the metal from the azo dyestuff and binding the said metal.

5. A process for the manufacture of metallizable monoazo dyestuffs, comprising the steps of treating a metal complex compound of a monoazo dyestuff of the formula

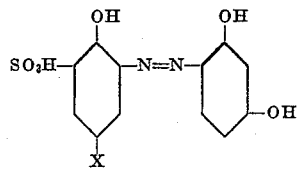

wherein X stands for alkyl, with an aromatic sulfonyl halide of the benzene series, and of subsequently treating the reaction product with an agent splitting off the metal from the azo dyestuff and binding the said metal.

6. A process for the manufacture of a metallizable monoazo dyestuff, comprising the steps of treating the copper complex compound of the monoazo dyestuff of the formula

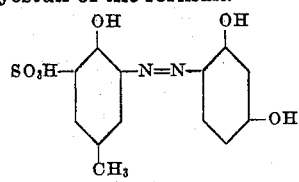

with p-toluenesulfonyl chloride and of subsequently removing the copper from the reaction product with sodium sulfide.

7. A process for the manufacture of a metallizable monoazo dyestuff comprising the steps of treating the iron complex compound of the monoazo dyestuff of the formula

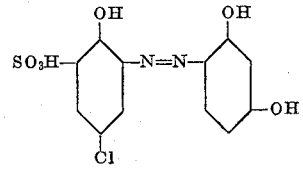

with p-toluenesulfonyl chloride and of subsequently removing the iron from the reaction product with oxalic acid.

8. A process for the manufacture of a metallizable monoazo dyestuff comprising the steps of treating the copper complex compound of the monoazo dyestuff of the formula

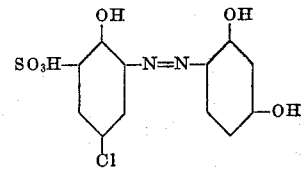

with benzene sulfonyl chloride and of subsequently removing the copper from the reaction product with hydrochloric acid.

9. New metallizable monoazo dyestuffs of the formula

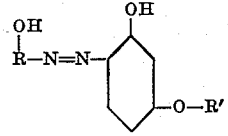

wherein R means a radical selected from the group consisting of benzene and naphthalene radicals, the hydroxy group attached to the radical R standing in ortho-position to the azo bridge, and wherein R' means a radical selected from the group consisting of alkyl, —SO₂alkyl, —SO₂-lower alkylated aryl and —SO₂ aryl.

10. New metallizable monoazo dyestuffs of the formula

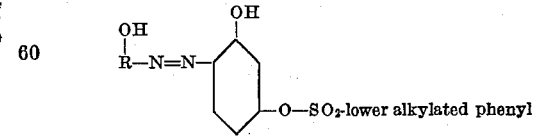

wherein R represents a mononuclear aromatic radical of the benzene series, the hydroxy group attached to the radical R standing in ortho-position to the azo bridge.

11. New metallizable monoazo dyestuffs of the formula

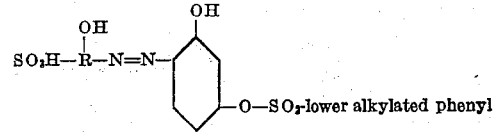

wherein R represents a mononuclear aromatic radical of the benzene series, the hydroxy group attached to the radical R standing in ortho-position to the azo bridge.

12. New metallizable monoazo dyestuffs of the formula

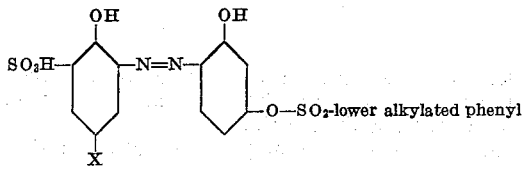

wherein X stands for halogen.

13. New metallizable monoazo dyestuffs of the formula

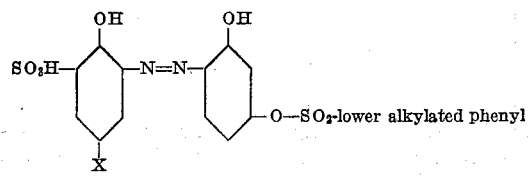

wherein X stands for alkyl.

14. A new metallizable monoazo dyestuff of the formula

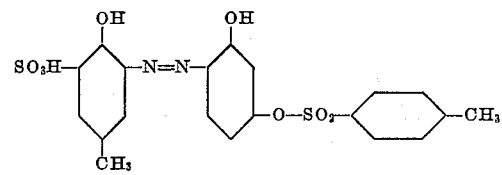

15. A new metallizable monoazo dyestuff of the formula

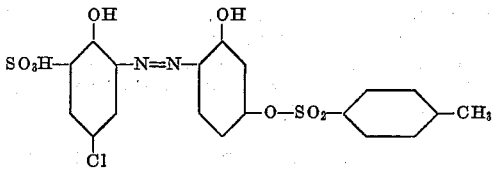

16. A new metallizable monoazo dyestuff of the formula

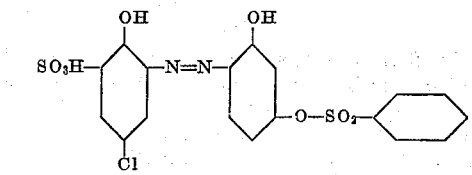

REINHARD NEIER.
WALTER WEHRLI.

REFERENCES CITED

The following references are of record in the file of this patent:

UNITED STATES PATENTS

| Number | Name | Date |
|---|---|---|
| 1,067,881 | Richard | July 22, 1913 |
| 1,880,432 | Grether | Oct. 4, 1932 |
| 2,008,602 | Straub et al. | July 6, 1935 |
| 2,353,675 | Knecht | July 18, 1944 |
| 2,437,868 | Von Glahn et al. | Mar. 16, 1948 |
| 2,495,244 | Felix et al. | Jan. 24, 1950 |

FOREIGN PATENTS

| Number | Country | Date |
|---|---|---|
| 410,192 | Great Britain | May 14, 1934 |